(12) United States Patent
Robison et al.

(10) Patent No.: US 10,841,318 B2
(45) Date of Patent: Nov. 17, 2020

(54) SYSTEMS AND METHODS FOR PROVIDING MULTI-USER LEVEL AUTHORIZATION ENABLED BIOS ACCESS CONTROL

(71) Applicant: Dell Products L.P., Round Rock, TX (US)

(72) Inventors: Charles D. Robison, Buford, PA (US); Daniel L. Hamlin, Round Rock, TX (US); Joseph Kozlowski, Hutto, TX (US); Ricardo L. Martinez, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 180 days.

(21) Appl. No.: 16/027,913

(22) Filed: Jul. 5, 2018

(65) Prior Publication Data

US 2020/0014701 A1  Jan. 9, 2020

(51) Int. Cl.
*G06F 21/00* (2013.01)
*H04L 29/06* (2006.01)
*G06F 21/57* (2013.01)

(52) U.S. Cl.
CPC .......... *H04L 63/105* (2013.01); *G06F 21/572* (2013.01); *H04L 63/062* (2013.01); *G06F 2221/034* (2013.01)

(58) Field of Classification Search
None
See application file for complete search history.

(56) References Cited

U.S. PATENT DOCUMENTS

| 2008/0022367 | A1* | 1/2008 | Dailey | G06F 21/32 726/4 |
| 2008/0052526 | A1* | 2/2008 | Dailey | G06F 21/32 713/186 |
| 2011/0208955 | A1* | 8/2011 | Anbazhagan | G06F 9/4401 713/2 |
| 2014/0122859 | A1* | 5/2014 | Ruelas | G06F 9/4411 713/2 |
| 2014/0230078 | A1* | 8/2014 | Graham | G06F 21/572 726/30 |
| 2020/0014701 | A1* | 1/2020 | Robison | H04L 63/105 |

OTHER PUBLICATIONS

"BIOS-enabled security features in HP business notebooks", Hewlett-Packard, 2012, p. 1-9. (Year: 2012).*
Microsoft Surface Enterprise Management Mode, https://docs.microsoft.com/en-us/surface/surface-enterprise-management-mode.

* cited by examiner

*Primary Examiner* — Jeffery L Williams
(74) *Attorney, Agent, or Firm* — Jackson Walker L.L.P.

(57) ABSTRACT

In accordance with embodiments of the present disclosure, an information handling system may include a processor and a program of instructions embodied in computer-readable media and configured to, when read and executed by the processor: responsive to administrator input associated with the information handling system or a second information handling system managed by the information handling system, set user permissions for one or more users with respect to basic input/output system (BIOS) settings of the information handling system or the second information handling system; and in accordance with the user permissions, create keys for securing BIOS settings of the information handling system or the second information handling system.

9 Claims, 3 Drawing Sheets

SYSTEMS AND METHODS FOR PROVIDING MULTI-USER LEVEL AUTHORIZATION ENABLED BIOS ACCESS CONTROL

TECHNICAL FIELD

The present disclosure relates in general to information handling systems, and more particularly to providing multi-user level authorization enabled basic input/output system (BIOS) control.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems use a basic input/output system (BIOS) configured to identify, test, and/or initialize information handling resources of the information handling system, often at system boot time. Accordingly, BIOS may be a foundational control point for using, customizing, provisioning, managing, and securing an information handling system and its various devices. Access to the BIOS must be controlled to prevent unauthorized changes which could be used to compromise an information handling system's availability, integrity, or confidentiality of the data stored within. The BIOS construct has been in place in the industry for decades and the need is often met through implementing rudimentary, non-scalable, few-to-one (e.g., few authorized agents to one device) password and password management. However, such construct does not effectively scale to large infrastructures undergoing acquisitions, reorganizations, information technology infrastructure updates, and end-of-life/lifecycle management when these passwords must be maintained in a secure manner. Adding to the complexity is the multitude of "white-box" redistributors and solution-as-a-service providers that separate owners of information handling systems from users and from infrastructure. Thus, information handling system providers (e.g., manufacturers, vendors) may desire to ensure system integrity to leverage existing technologies and standards without compromising a device attack surface nor letting users of information handling systems inadvertently disable key security features either by accident or without proper knowledge of side effects.

Another concern is the management of user privileges for BIOS feature changes from a corporate infrastructure perspective. Administrators may desire to allow end users to make BIOS setting changes but may desire to prevent the incidental disabling of larger features which are dependent upon those settings.

SUMMARY

In accordance with the teachings of the present disclosure, the disadvantages and problems associated with existing approaches to BIOS access control in an information handling system may be reduced or eliminated.

In accordance with embodiments of the present disclosure, an information handling system may include a processor and a program of instructions embodied in computer-readable media and configured to, when read and executed by the processor: responsive to administrator input associated with the information handling system or a second information handling system managed by the information handling system, set user permissions for one or more users with respect to basic input/output system (BIOS) settings of the information handling system or the second information handling system; and in accordance with the user permissions, create keys for securing BIOS settings of the information handling system or the second information handling system.

In accordance with these and other embodiments of the present disclosure, a method may comprise, at an information handling system: responsive to administrator input associated with the information handling system or a second information handling system managed by the information handling system, setting user permissions for one or more users with respect to basic input/output system (BIOS) settings of the information handling system or the second information handling system; and in accordance with the user permissions, creating keys for securing BIOS settings of the information handling system or the second information handling system.

In accordance with these and other embodiments of the present disclosure, an article of manufacture may comprise a computer readable medium and computer-executable instructions carried on the computer readable medium, the instructions readable by a processor, the instructions, when read and executed, for causing the processor to, on an information handling system: responsive to administrator input associated with the information handling system or a second information handling system managed by the information handling system, set user permissions for one or more users with respect to basic input/output system (BIOS) settings of the first information handling system or the second information handling system; and in accordance with the user permissions, create keys for securing BIOS settings of the information handling system or the second information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
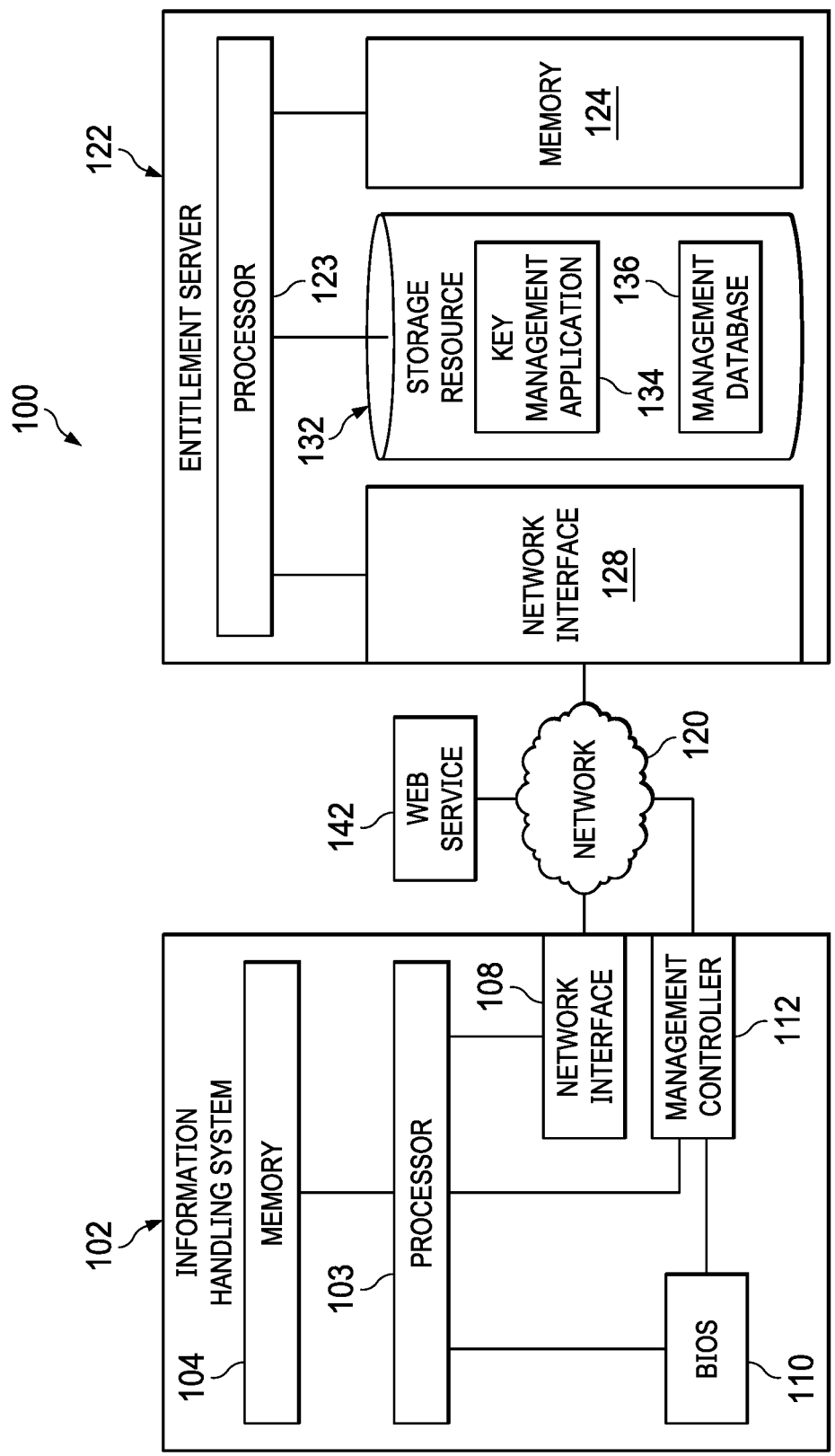
FIG. 1 illustrates a block diagram of an example system for providing multi-level user authorization enabled BIOS access control, in accordance with embodiments of the present disclosure.
Figure 2:
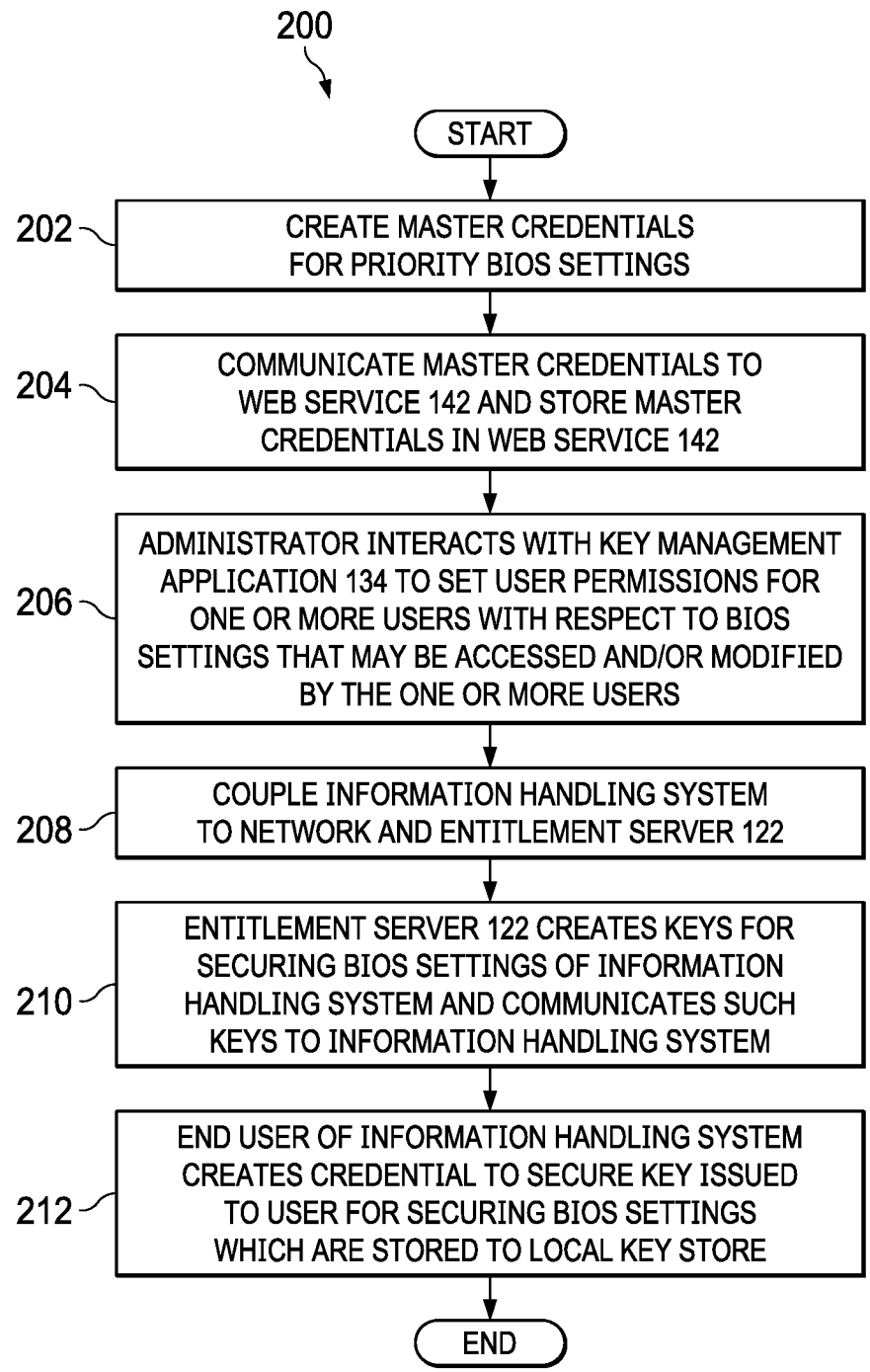
FIG. 2 illustrates a flow chart of an example method for provisioning an information handling system for multi-level user authorization enabled BIOS access control, in accordance with embodiments of the present disclosure.
Figure 3:
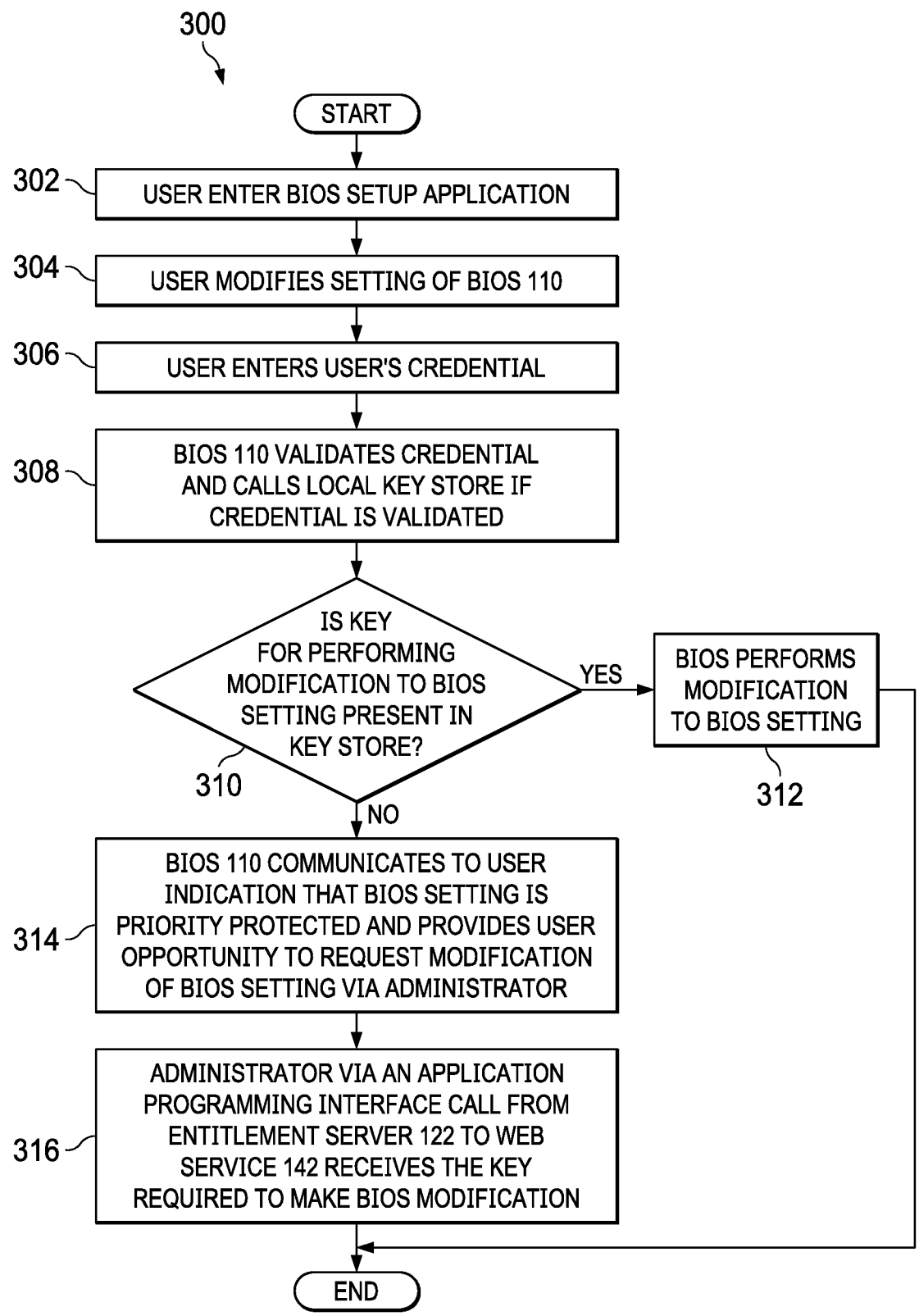
FIG. 3 illustrates a flow chart of an example method for multi-level user authorization enabled BIOS access control, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100 for providing multi-level user authorization enabled BIOS access control, in accordance with embodiments of the present disclosure. As shown in FIG. 1, system 100 may include an information handling system 102, an entitlement server 122, a web service 142, and a network 120 communicatively coupling information handling system 102, entitlement server 122, and web service 142 to one another.

In some embodiments, information handling system 102 may be a personal computer. In some embodiments, information handling system 102 may comprise or be an integral part of a server. In other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a network interface 108 communicatively coupled to processor 103, a basic input/output system (BIOS) 110, communicatively coupled to processor 103, and a management controller 112 coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, BIOS 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Network interface 108 may comprise any suitable system, apparatus, or device operable to serve as an interface between information handling system 102 and entitlement server 122 and/or other information handling systems. Network interface 108 may enable information handling system 102 to communicate using any suitable transmission protocol and/or standard, including without limitation, all transmission protocols and/or standards enumerated below with respect to the discussion of network 120. In these and other embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

Management controller 112 may be communicatively coupled to processor 103 and may comprise any system, device, or apparatus configured to facilitate management and/or control of information handling system 102, and/or one or more of its component information handling resources. Management controller 112 may be configured to issue commands and/or other signals to manage and/or control information handling resources of information handling system 102. Management controller 112 may comprise a microprocessor, microcontroller, DSP, ASIC, field programmable gate array ("FPGA"), EEPROM, or any combination thereof.

In addition or alternatively, management controller 112 may also provide a management console for user/administrator access to these functions. For example, management controller 112 may provide for communication with a user interface, permitting a user to interact with management controller 112 and configure control and management of components of information handling system 102 by management controller 112. As another example, management controller 112 may act as a proxy and establish communication between two information handling resources by either configuring them to directly couple to each other or transfer information by receiving information from one information handling resource, processing the information if needed, and then transferring the information to the other information handling resource. As a further example, management controller 112 may implement Web Services Management ("WS-MAN") or another suitable management protocol permitting a user to remotely access a management controller 112 to configure information handling system 102 and its various information handling resources. In such embodiments, management controller 112 may interface with a network interface separate from a traditional network interface of information handling system 102 (e.g., separate from network interface 108), thus allowing for "out-of-band" control of information handling system 102, such that communications to and from management controller 112 are communicated via a management channel physically isolated from an "in band" communication channel with the traditional network interface. Thus, for example, if a failure occurs in information handling system 102 that prevents an administrator from interfacing with information handling system 102 via a traditional network interface and/or user interface (e.g., operating system failure, power failure, etc.), the administrator may still be able to monitor and/or manage information handling system 102 (e.g., to diagnose problems that may have caused failure) via management controller 112. In the same or alternative embodiments, management controller 112 may allow an administrator to remotely manage one or more parameters associated with operation of information handling system 102 and its various information handling resources (e.g., power usage, processor allocation, memory allocation, security privileges, etc.). In certain embodiments, management controller 112 may include or may be an integral part of a chassis management controller (CMC), a baseboard management controller (BMC), Dell Remote Management controller (DRAC) or an Integrated Dell Remote Management controller (iDRAC). In these and other embodiments, management controller 112 may also be referred to as an access controller or a life-cycle controller.

In addition to processor 103, memory 104, network interface 108, BIOS 110, and storage resource 112, information handling system 102 may include one or more other information handling resources.

Network 120 may be a network and/or fabric configured to couple entitlement server 122 and information handling system 102 to each other and/or one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

In some embodiments, entitlement server 122 may be a server. In other embodiments, entitlement server 122 may be a personal computer (e.g., a desktop computer or a portable computer). As depicted in FIG. 1, entitlement server 122 may include a processor 123, a memory 124 communicatively coupled to processor 123, a network interface 128 communicatively coupled to processor 123, and a storage resource 132 communicatively coupled to processor 123.

Processor 123 may include any system, device, or apparatus configured to interpret and/or execute program instructions and/or process data, and may include, without limitation a microprocessor, microcontroller, DSP, ASIC, or any other digital or analog circuitry configured to interpret and/or execute program instructions and/or process data. In some embodiments, processor 123 may interpret and/or execute program instructions and/or process data stored in memory 124 and/or another component of entitlement server 122.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to entitlement server 122 is turned off.

Network interface 128 may comprise any suitable system, apparatus, or device operable to serve as an interface between entitlement server 122 and network 120. Network interface 128 may enable entitlement server 122 to communicate using any suitable transmission protocol and/or standard, including any of the protocols and/or standards described above with respect to network 120. In these and other embodiments, network interface 128 may comprise a NIC.

Storage resource 132 may include a system, device, or apparatus configured to store data. Storage resource 132 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 132 may include one or more storage enclosures configured to hold and/or power one or more of such devices. In the embodiments represented by FIG. 1, storage resource 132 may reside within entitlement server 122. However, in other embodiments, storage resource 132 may reside external to entitlement server 122 (e.g., may be coupled to entitlement server 122 via network 120).

As shown in FIG. 1, storage resource 132 may have stored thereon key management application 134 and management database 136. Key management application 134 may comprise one or more programs of instructions configured to, when loaded from storage resource 132 into memory 124 and executed by processor 123, manage access to BIOS 110 of information handling system 102, in addition to other information handling systems to which entitlement server 122 may be coupled. Thus, key management application 134 may include an administrator console and/or other functionality for performing such access management, as described in greater detail in this disclosure. In some embodiments, key management application 132 and entitlement server 122 may be enabled to operate and communicate in accordance with Key Management Interoperability Protocol (KMIP).

Management database 136 may include a table, list, map, database, and/or other data structure which sets forth information for performing multi-level user authorization enabled BIOS access control of information handling system 102 and other information handling systems managed by entitlement server 122. Accordingly, management database 136 may have stored therein information regarding users, managed information handling systems, keys, passwords, access privileges, access policies, and/or any other relevant information.

Although key management application 134 and management database 136 are shown local to entitlement server 122, in some embodiments, key management application 134 and management database 136 may be local to information handling system 102 and interface with BIOS 105 at information handling system 102.

In addition to processor 123, memory 124, network interface 128, and storage resource 132, entitlement server 122 may include one or more other information handling resources.

Web service 142 may be any service available to entitlement server 122 via network 120 for access control and maintenance of credentials (e.g., master key) for priority protected BIOS features, as described in greater detail below. In some embodiments, web service 142 may be maintained by a manufacturer, vendor, or other provider of information handling system 102.

In operation, as described in greater detail below, BIOS 110 and key management application 134 may be configured with functionality to create a streamlined and highly-secure mechanism to allow users (e.g., administrators) to configure and manage the BIOS of all managed information handling systems throughout their lifecycles and through multiple users, while minimizing security exposures through incidental disabling of BIOS features.

To enable multi-level user enabled BIOS access control, each information handling system (e.g., information handling system 102) may be provisioned with a master credential issued at the time of its manufacture for each BIOS feature to be controlled. Each subsequent credential created for the information handling system may be tied to a unique identifier of the information handling system until such time as the information handling system can be tied to a web account maintained by web service 142.

In addition, entitlement server 122 and key management application 134 may be configured to provide an administrator console for BIOS access control and management of user permissions for BIOS access control, may be configured to derive keys for BIOS settings and/or features, may be configured to communicate with web service 142 to obtain a master key for priority protected BIOS features, and/or may be configured to manage information within management database 136.

Within an information handling system 102 itself, BIOS 110 may be configured with a local application programming interface which allows BIOS 110 to communicate with entitlement server 122 using either in-band communication (e.g., via network interface 108 when information handling system 102 is powered on) or out-of-band communication (e.g., via management controller 112). BIOS 110 may also be configured to provision and de-provision keys into a local key store maintained by BIOS 110, and manage user authentication to BIOS 110 to control access to BIOS setting keys. BIOS 110 may also have a local secure storage for storing keys and/or user authorization credentials.

Thus, an enterprise may obtain (e.g., purchase) an information handling system 102 provisioned with certain priority protected BIOS settings enabled and protected from change via a master password/key managed by a manufacturer, vendor, or other provider of information handling system and available through web service 142 to allow clear messaging from authorized users of the information handling system to prevent accidental security exposures such as disabling certain features and exposing information handling system to security vulnerabilities.

In addition, key management application 134 may allow for management of access privileges for multiple users (e.g., multiple administrators and/or end users) to have access granted, revoked, or modified for changing to BIOS settings.

FIG. 2 illustrates a flow chart of an example method 200 for provisioning an information handling system 102 for multi-level user authorization enabled BIOS access control, in accordance with embodiments of the present disclosure. According to some embodiments, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, in response to an enterprise's purchase of an information handling system (or other manifestation of intent to acquire the information handling system), master credentials (e.g., a password) may be created for priority protected BIOS settings, such that modifications to such priority protected BIOS settings are locked unless such master credentials are provided to a BIOS. At step 204, such master credentials may be communicated to and stored by web service 142, wherein such master credentials may be tied to a user account associated with the enterprise and a unique identifier associated with the information handling system.

At step 206, an administrator of the enterprise may log into entitlement server 122 and interact with key management application 134 to set user permissions for one or more users with respect to BIOS settings that may be accessed and/or modified by the one or more users.

At step 208, the information handling system may be coupled to a network, thus coupling the information handling system to entitlement server 122. In response, at step 210, entitlement server 122 may create keys for securing BIOS settings of the information handling system and communicate such keys to the information handling system (e.g., via a local device application programming interface using KMIP).

At step 212, an end user of the information handling system may create a credential (e.g., password) to secure the key issued to the user for securing BIOS settings. Such credential and key may be stored to a local key store of BIOS 110. After completion of step 212, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

FIG. 3 illustrates a flow chart of an example method for multi-level user authorization enabled BIOS access control, in accordance with embodiments of the present disclosure. According to some embodiments, method 300 may begin at step 302. As noted above, teachings of the present disclosure may be implemented in a variety of configurations of system 100. As such, the preferred initialization point for method 300 and the order of the steps comprising method 300 may depend on the implementation chosen. Information handling system 102 may be configured such that method 300 may only execute during a boot or other initialization of information handling system 102.

At step 302, a user of an information handling system 102 may enter a BIOS setup application for modifying settings of BIOS 110. At step 304, the user may modify a setting of BIOS 110. At step 306, the user may enter the user's credential (e.g., password). At step 308, BIOS 110 may validate the credential and call a local key store if the credential is validated.

At step 310, BIOS 110 may determine if a key for performing the modification to the BIOS setting is present in the key store. If a key for performing the modification to the BIOS setting is present in the key store, method 300 may proceed to step 312. Otherwise, method 300 may proceed to step 314.

At step 312, in response to a key for performing the modification to the BIOS setting being present in the key store, BIOS 110 may perform the modification to the BIOS setting. After completion of step 310, method 300 may end.

At step 314, in response to a key for performing the modification to the BIOS setting not being present in the key store, BIOS 110 may communicate to the user (e.g., via a message displayed to a display device) an indication that the BIOS setting is priority protected and may provide the user an opportunity to request modification of the BIOS setting via an administrator. In some embodiments, such request may be made by communicating the request from information handling system 102 to entitlement server 122.

At step 316, in response to a user requesting the BIOS setting modification from an administrator, the administrator may via an application programming interface call from entitlement server 122 to web service 142, receive the key required to make the BIOS modification, which may in turn be communicated to information handling system 102 such that BIOS 110 may complete the modification to the BIOS setting. After completion of step 316, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using system 100 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a processor;
   a program of instructions embodied in non-transitory computer-readable media and configured to, when read and executed by the processor:
   responsive to administrator input associated with a second information handling system managed by the information handling system, set user permissions for one or more users with respect to basic input/output system (BIOS) settings of the second information handling system;

in accordance with the user permissions, create keys for securing BIOS settings of the second information handling system;

communicate the keys to the second information handling system via a network for storage in a local key store of a BIOS of the second information handling system;

receive a request from the second information handling system responsive to the BIOS of the second information handling system determining that the local key store does not possess a needed key for modifying a particular BIOS setting of the BIOS; and responsive to the request, communicate a call for the needed key for modifying the particular BIOS setting via an application programming interface and a network to a service for maintaining keys.

2. The information handling system of claim 1, wherein the
service for maintaining keys is further configured to maintain keys for priority protected BIOS settings.

3. The information handling system of claim 1, wherein the program of instructions is further configured to communicate the needed key to the second information handling system such that the BIOS is operable to use the needed key for modifying the BIOS setting.

4. A method comprising, at an information handling system:

responsive to administrator input associated with a second information handling system managed by the information handling system, setting user permissions for one or more users with respect to basic input/output system (BIOS) settings of the second information handling system;

in accordance with the user permissions, creating keys for securing BIOS settings of the second information handling system;

communicating the keys to the second information handling system via a network for storage in a local key store of a BIOS of the second information handling system;

receiving a request from the second information handling system responsive to the BIOS of the second information handling system determining that the local key store does not possess a needed key for modifying a particular BIOS setting of the BIOS; and responsive to the request, communicating a call for the needed key for modifying the particular BIOS setting via an application programming interface and a network to a service for maintaining keys.

5. The method of claim 4, wherein the
service for maintaining keys is further configured to maintain keys for priority protected BIOS settings.

6. The method of claim 4, further comprising communicating the needed key to the second information handling system such that the BIOS is operable to use the needed key for modifying the BIOS setting.

7. An article of manufacture comprising:

a non-transitory computer readable medium; and computer-executable instructions carried on the computer readable medium, the instructions readable by a processor, the instructions, when read and executed, for causing the processor to, on an information handling system:

responsive to administrator input associated with a second information handling system managed by the information handling system, set user permissions for one or more users with respect to basic input/output system (BIOS) settings of the second information handling system;

in accordance with the user permissions, create keys for securing BIOS settings of the second information handling system;

communicate the keys to the second information handling system via a network for storage in a local key store of a BIOS of the second information handling system;

receive a request from the second information handling system responsive to the BIOS of the second information handling system determining that the local key store does not possess a needed key for modifying a particular BIOS setting of the BIOS; and responsive to the request, communicate a call for the needed key for modifying the particular BIOS setting via an application programming interface and a network to a service for maintaining keys.

8. The article of claim 7, wherein the the
service for maintaining keys is further configured to maintain keys for priority protected BIOS settings.

9. The article of claim 7, the instructions for further causing the processor to communicate the needed key to the second information handling system such that the BIOS is operable to use the needed key for modifying the BIOS setting.

* * * * *